(12) United States Patent
Sakai

(10) Patent No.: US 7,999,218 B2
(45) Date of Patent: Aug. 16, 2011

(54) RADIATION DETECTOR

(75) Inventor: Hirotaka Sakai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/882,017

(22) Filed: Jul. 30, 2007

(65) Prior Publication Data

US 2008/0073537 A1 Mar. 27, 2008

(30) Foreign Application Priority Data

Sep. 27, 2006 (JP) .................................. 2006-262438

(51) Int. Cl.
*G01D 18/00* (2006.01)
(52) U.S. Cl. ................................................... 250/252.1
(58) Field of Classification Search ................ 250/252.1
See application file for complete search history.

(56) References Cited

U.S. PATENT DOCUMENTS

| 5,117,113 A * | 5/1992 | Thomson et al. ........ 250/370.07 |
| 6,037,966 A * | 3/2000 | Sakakibara ................... 347/252 |
| 6,388,250 B1 * | 5/2002 | Croydon et al. ........... 250/252.1 |
| 7,071,474 B2 * | 7/2006 | Wong et al. ............... 250/363.09 |
| 2005/0247881 A1 * | 11/2005 | Kobayashi et al. ...... 250/370.07 |

FOREIGN PATENT DOCUMENTS

| JP | 6-072930 B2 | 9/1994 |
| JP | 2006-084345 A | 3/2006 |

* cited by examiner

*Primary Examiner* — David P Porta
*Assistant Examiner* — Carolyn Igyarto
(74) *Attorney, Agent, or Firm* — Foley & Lardner LLP

(57) ABSTRACT

A radiation detector includes: a radiation detecting unit including a radiation sensor detecting a radiation sensitive to light, a signal amplifier, a pulse-height discriminator, and a counter; an optical pulse emitting unit configured to emit an optical pulse for confirming operational integrity of the radiation detecting unit; an emission controlling unit configured to control an operation of the optical pulse emitting unit; and a light path through which light is led from the optical pulse emitting unit to a vicinity of the radiation sensor. The emission controlling unit including a mechanism for adjusting emission time characteristics of the optical pulse emitting unit.

18 Claims, 4 Drawing Sheets

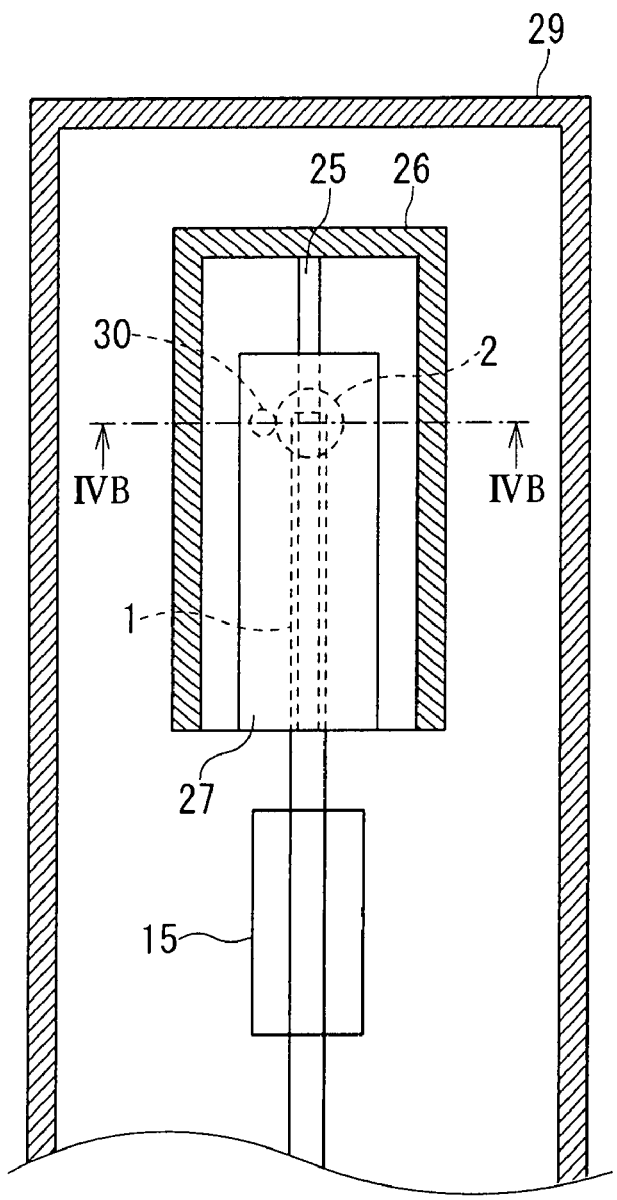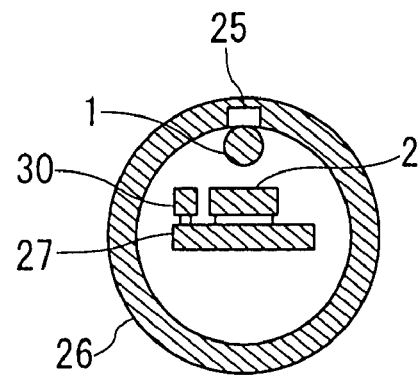
FIG. 4A
FIG. 4B

RADIATION DETECTOR

BACKGROUND OF THE INVENTION

1. Field of the Invention

The present invention relates to a radiation detector detecting radiations, and more particularly, to a radiation detector, including an operation confirming unit using an optical pulse, which is continuously usable for a long time.

2. Related Art

In a conventional radiation detector, a radiation source called a bug source is provided in or outside the radiation detector. A certain amount of radiations is emitted from the bug source into a radiation detector in the radiation detector, and a response of the radiation detector to the radiations incident on the radiation detector is evaluated in order to confirm the operational integrity of the radiation detector in use. However, it is complicated to treat the radiation source used as the bug source and it is difficult to confirm the operation of the radiation detector over the entire measurement range.

In some radiation detectors which do not use the bug source and use a light-sensitive radiation sensor, an optical pulses emitted from optical pulse generator is provided in the radiation detector, the radiation sensor is irradiated with the optical pulse, and the response of the radiation detector to the optical pulses is verified.

Japanese Unexamined Patent Application Publication No. 6-72930 discloses an operation confirming unit for a radiation detector, using optical pulses. A radiation sensor in the radiation detector is irradiated with an optical pulse to detect any abnormality in the bias voltage on the basis of a response from the radiation sensor. The operation confirming unit detects any abnormality in the bias voltage in accordance with the fact whether the response of the radiation detector to the optical pulse is within a predetermined range or not.

Japanese Unexamined Patent Application Publication No. 2006-84345 discloses a method of confirming the operational integrity of a radiation detector by using optical pulses. An optical pulse emitting unit is used as radiation means for calibration. Data concerning the pulse height spectrum of the radiation detector irradiated with an optical pulse is analyzed to evaluate the operational integrity of the radiation detector.

However, since the radiation means for calibration does not always offer a constant amount of output in the radiation detectors disclosed in both the Japanese Unexamined Patent Application Publication No. 6-72930 and No. 2006-84345, it is not possible to constantly evaluate or confirm the integrity of the radiation detector. This is because (1) continuous use of the optical pulse emitting unit for a long time varies the amount of light emission and (2) a difference between the time response characteristics of the light emission and those of the radiation possibly damages the function of the radiation detector, which detects the radiations.

Particularly, if the radiation detector has a function of correcting a dead time, the time response characteristics of the light emission which are different from those of the radiation can increase a difference based on the function of correcting the dead time.

Accordingly, the operation confirming unit using optical pulses in the related art causes no problem when it is used as a temporal operation confirming unit. However, when the operation confirming unit using optical pulses in the related art is constantly used, the radiation detector cannot possibly measure any variation with age of the radiations to be measured correctly. Consequently, it is difficult to continue to constantly use the operation confirming function while keeping the reliability of the radiation detector as a radiation measuring apparatus.

SUMMARY OF THE INVENTION

The present invention was conceived in consideration of the circumstances of the prior art mentioned above, and an object thereof is to provide a radiation detector capable of using an optical pulse emitting unit, without using a radioactive material, to confirm the operational integrity of the radiation detector for a long time.

This and other objects can be achieved according to the present invention, there is provided a radiation detector including: a radiation detecting unit including a radiation sensor detecting a radiation sensitive to light, a signal amplifier, a pulse-height discriminator, and a counter; an optical pulse emitting unit configured to emit an optical pulse for confirming operational integrity of the radiation detecting unit; an emission controlling unit configured to control an operation of the optical pulse emitting unit; and a light path through which light is led from the optical pulse emitting unit to a vicinity of the radiation sensor, in which the emission controlling unit includes a mechanism for adjusting emission time characteristics of the optical pulse emitting unit.

In preferred embodiments of the above aspect, the emission controlling unit may include a clock generator, a rising edge detector, a triangular wave generator, an amplifier, and a pulse-height discriminator, and the amplifier includes an amplification varying unit configured to adjust the emission time characteristics. The amplification varying unit may be composed of a variable resistor.

The emission controlling unit may include a clock generator, a rising edge detector, a triangular wave generator, an amplifier, and a pulse-height discriminator, and the pulse-height discriminator includes a discriminated pulse-height value varying unit configured to adjust the emission time characteristics. The discriminated pulse-height value varying unit in the pulse-height discriminator may be composed of a variable resistor.

The radiation detector may further include an amount-of-light adjusting mechanism adjusting an amount of light incident on the radiation sensor. The amount-of-light adjusting mechanism has a configuration varying a distance from the end of the light path toward the radiation sensor to the radiation sensor, the incident light being led from the optical pulse emitting unit to a vicinity of the radiation sensor through the light path.

The radiation detector may further include a circuit board to which the radiation sensor is attached, and a filter provided around the circuit board for adjusting response characteristics of the radiation. The filter along the light path may have a thickness smaller than that of a remaining portion of the filter. The filter may be formed with a groove along which the light path is provided. It may be desired that a portion of the filter along the light path is formed of a material different from a material of the remaining portion of the filter.

The light path may have, at a tip end thereof, an extension made of a material similar to that of the light path.

The light path may be formed from an optical fiber.

The radiation detector may further include a light sensor disposed at a portion near the radiation sensor for monitoring emission characteristics. The emission time characteristics of the optical pulse emitting unit may be adjusted in accordance with an output from the light sensor. The distance from the end of the light path to the radiation sensor may be varied in accordance with an output from the light sensor. It may be desired that an amplification of the amplifier or a discriminated pulse-height value of the pulse-height discriminator is varied in accordance with an output from the light sensor.

The radiation sensor may be composed of a silicon diode, a scintillator and a photomultiplier, or a semiconductor made of cadmium telluride.

According to the present invention, it is possible to use an optical pulse emitting unit, without using a radioactive material, to constantly confirm the operational integrity of the radiation detector for a long time.

The nature and further characteristic features of the present invention will be made clearer from the following descriptions made with reference to the accompanying drawings.

BRIEF DESCRIPTION OF THE DRAWINGS

In the accompanying drawings:

FIG. 4A is a sectional view of a radiation detecting portion of the radiation detector according to the third embodiment of the present invention and FIG. 4B is a cross-sectional view of the radiation detector taken along the line IVB-IVB in FIG. 4A.

DESCRIPTION OF THE PREFERRED EMBODIMENTS

Preferred embodiments of a radiation detector of the present invention will be described hereunder with reference to the accompanying drawings.

Although an optical fiber is used as a light path in the embodiments of the present invention described below, the light path may be composed of any member, such as a light guide, through which light is transmitted. Furthermore, although a metal filter is used as a filter, the filter is not limited to the metal filter as long as the filter is made of a material having scattering and absorption performance.

A semiconductor device made of silicon or cadmium telluride may be used as a semiconductor radiation detecting device serving as a radiation sensor according to the embodiment of the present invention. In addition, a scintillator and a photomultiplier may be used as the radiation sensor.

Furthermore, the light used in the embodiments of the present invention is not limited to visible light and may be light in an ultraviolet or infrared region.

First Embodiment

Figure 1:
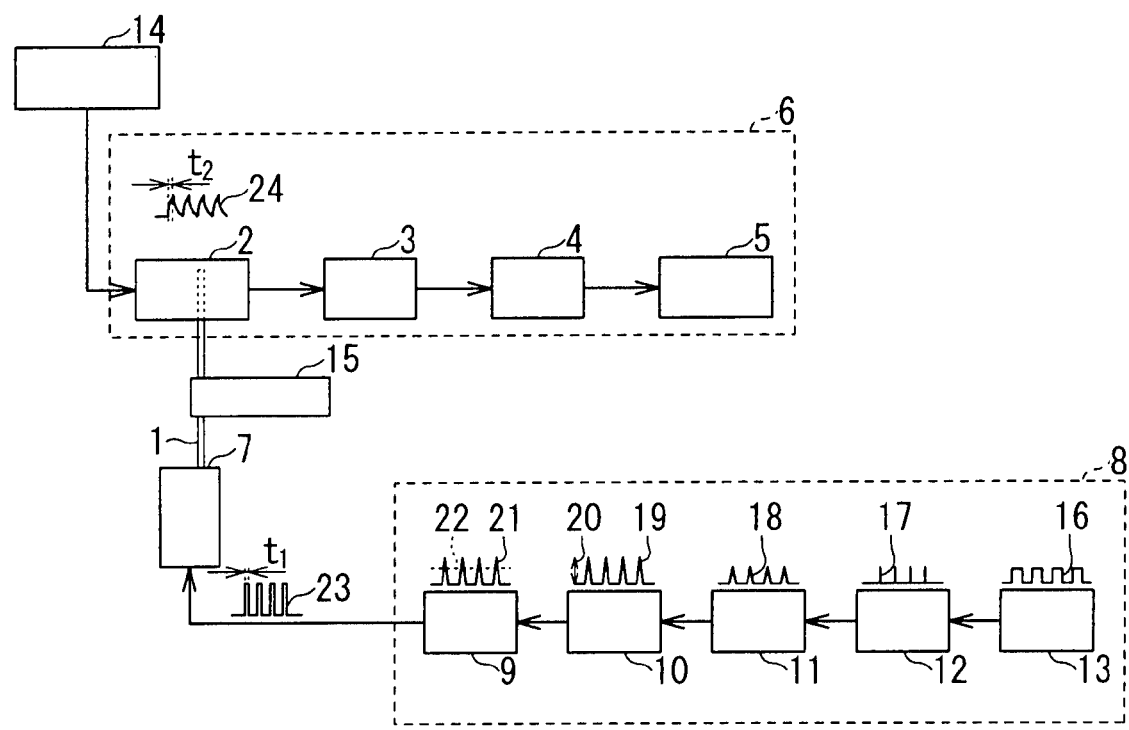
FIG. 1 is a block diagram illustrating an example of a configuration of a radiation detector according to a first embodiment of the present invention.

FIG. 1 is a block diagram showing an example of the configuration of a radiation detector according to a first embodiment of the present invention.

The radiation detector according to the first embodiment includes: an optical fiber 1, a radiation detecting unit 6 including a radiation sensor 2, a signal amplifier 3, a pulse-height discriminator 4, and a counter 5; an optical pulse emitting unit 7, such as a light emitting diode (LED); an emission controlling unit 8; a bias power supply 14; and an optical-fiber end adjusting mechanism 15. The radiation sensor 2 is a semiconductor radiation detecting device sensitive to light. The emission controlling unit 8 includes a pulse-height discriminator 9, an amplifier 10, a triangular wave generator 11, a rising edge detector 12, and a clock generator 13.

An operation of the emission controlling unit 8 will now be described.

The clock generator 13 outputs a waveform signal 16 having a predetermined cycle in order for the counter 5 to confirm whether the radiation sensor 2 normally operates. This cycle of the waveform signal 16 is normally determined on the basis of two conditions such that the incidence of a radiation to be measured is not blocked and that, when a counting rate is calculated in the counter 5, values do not vary depending on a time constant used in the calculation of the counting rate.

The waveform signal 16 is supplied to the rising edge detector 12 to generate a rising signal 17. The rising signal 17 is supplied to the triangular wave generator 11 to generate a triangular wave 18. The triangular wave 18 is converted into a signal waveform 23 having a width $t_1$ at a pulse-height discrimination level 22 by the pulse-height discriminator 9.

The signal having the signal waveform 23 is supplied to the optical pulse emitting unit 7 through the optical fiber 1. Since the width $t_1$ of the signal waveform 23 is varied, adjustment of the width $t_1$ allows a rising time $t_2$ of an output signal 24 from the radiation sensor 2 to be varied. The output from the radiation sensor 2 is supplied to the counter 5 through the signal amplifier 3 and the pulse-height discriminator 4 and is counted by the counter 5, like a radiation detection signal.

In order to change the width of the signal waveform 23, the amplification of the amplifier 10 may be varied to change a peak value of an output signal waveform 19, or the pulse-height discrimination level 22 in the pulse-height discriminator 9 may be varied. In both the cases, the variation can be realized by a very simple method, for example, by using a variable resistor.

The peak value of the output signal 24 from the radiation sensor 2 in response to the pulse emission may be yielded by changing the maximum height value of the output signal 24. However, if the signal supplied to the optical pulse emitting unit 7 has a larger maximum height value, an undesired effect, such as a variation in the emission time or persistence, will be produced. Accordingly, the radiation detector includes the optical-fiber end adjusting mechanism 15, which serves as an amount-of-light adjusting mechanism and which is capable of adjusting the end position of the optical fiber 1, in addition to the adjustment of the signal applied to the optical pulse emitting unit 7. This amount-of-light adjusting mechanism can be used to adjust the amount of light incident on the radiation sensor 2.

With the above configuration of the radiation detector, the output signal 24 from the radiation sensor 2 in response to the light emission from the optical pulse emitting unit 7 has time response characteristics similar to those of the output signal in response to the incidence of the radiation. Accordingly, it is possible to constantly confirm the operational integrity of the radiation detector for a long time.

Particularly, the radiation detector adopts the mechanism for adjusting the time response characteristics by using a variable resistor to, for example, vary the amplification of the signal or the pulse-height discrimination level, and the mechanism for adjusting the time response characteristics by using a screw to, for example, change the position of the optical fiber 1. Accordingly, it is possible to provide the radiation detector capable of easily adjusting the time response characteristics by using, for example, a screw or a trimmer knob.

Second Embodiment

Figures 2A, 2B:
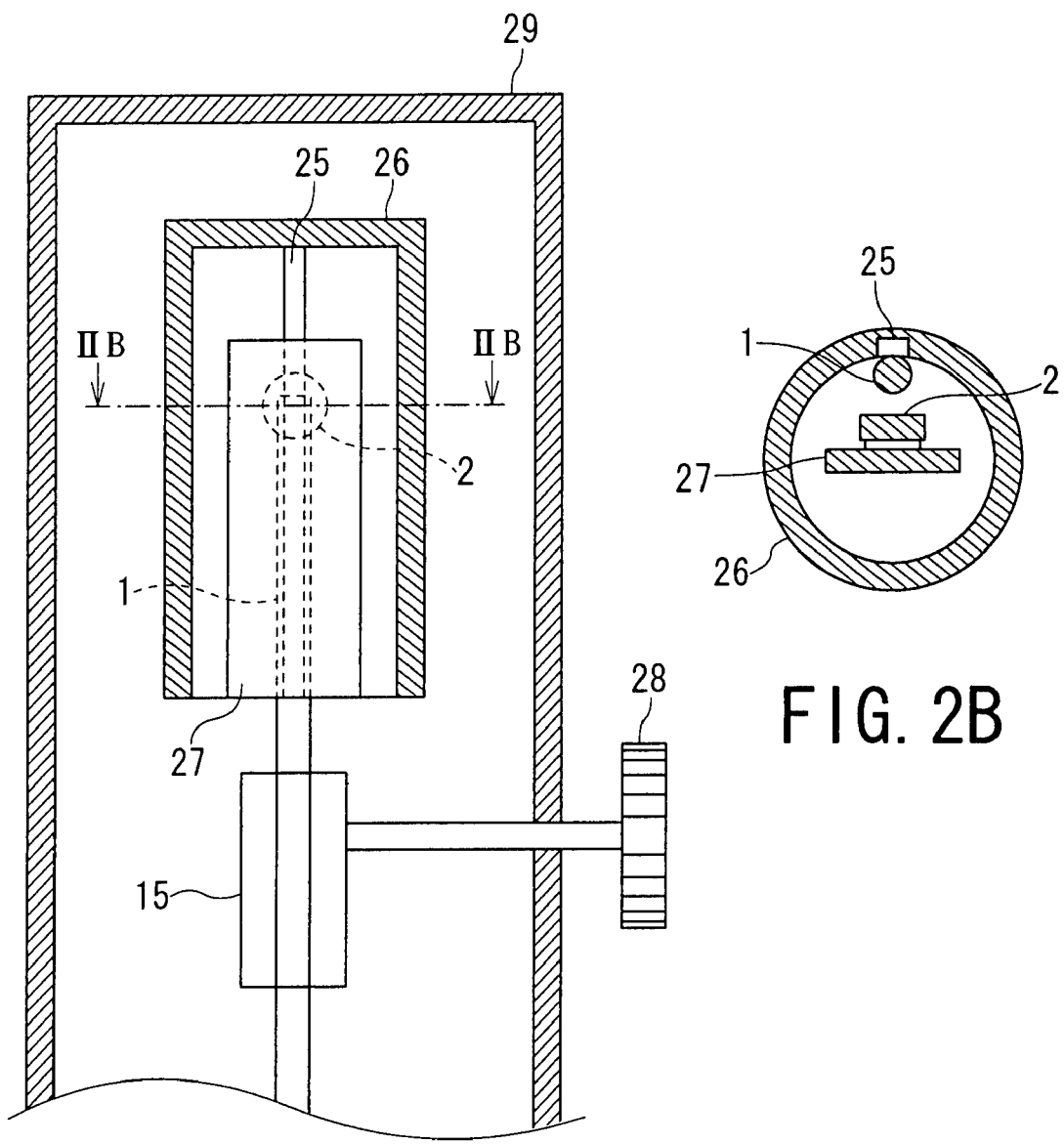
FIG. 2A is a sectional view illustrating a radiation detecting portion of a radiation detector according to a second embodiment of the present invention and FIG. 2B is a cross-sectional view of the radiation detector taken along the line IIB-IIB in FIG. 2A.

A radiation detector according to a second embodiment of the present invention will be described hereunder with reference to FIGS. 2A and 2B.

The radiation detector according to the second embodiment of the present invention is characterized by the configuration around the radiation sensor 2 according to the first embodiment of the present invention. The radiation detector according to the second embodiment includes the radiation sensor 2, a circuit board 27 to which the radiation sensor 2 is attached, and a metal filter 26 surrounding the circuit board 27.

A groove 25 is provided on the inner surface of the metal filter 26, and the optical fiber 1 is laid along the groove 25. In addition, the optical-fiber end adjusting mechanism 15 is provided along the optical fiber 1 and an optical-fiber alignment knob 28 is used to vertically move the optical fiber 1. The optical-fiber alignment knob 28 is operated outside an external case 29 of the radiation detector.

Although this vertical movement mechanism is not described in detail, the mechanism uses a normal driving unit using gears. The other components of this second embodiment, which are not shown in FIGS. 2A and 2B, are similar to those of the first embodiment of the present invention, and the detailed description thereof is omitted herein.

The radiation detector according to the second embodiment of the present invention monitors radiations in various units, such as a 1 cm-dose equivalent (rate) (unit: sievert (per second)), an absorbed dose (rate) (unit: gray (per second)), and an emission rate (unit: particles per second).

The response from the radiation detector is a signal generated by an electric charge caused by ionization resulting from interaction between the particles of an incident radiation and the radiation sensor 2. The probability of the signal being generated does not necessarily exhibit a distribution within a range allowable to the whole energy area of the radiations to be monitored. Therefore, according to the second embodiment of the present invention, the metal filter 26 is used inside the radiation detector so that the energy characteristics are flattened. The radiation scattering and absorption effect caused by the metal filter 26 allows the response from the radiation detector to be adjusted to a form suitable for the system of units of the radiations to be measured.

However, when the optical fiber 1 is provided inside the metal filter 26, the radiation scattering and absorption phenomenon at positions where the optical fiber 1 is laid differs from that at other positions. As a result, the energy characteristics vary in the direction in which the optical fiber 1 exists with respect to the radiation sensor 2, compared with the energy characteristics in other directions.

According to the second embodiment of the present invention, the groove 25 is provided in the metal filter 26 in the direction in which the optical fiber 1 exists in order to eliminate such a phenomenon, that is, the directional dependency of the energy characteristics.

The presence of the groove 25 may cause an effect due to a reduction in the scattering and absorption effect in an area above the upper end of the optical fiber 1. If the length of this area is sufficiently shorter than the full length of the metal filter 26, it is possible to ignore the effect. If the length of this area is too long to ignore the effect, an extension made of a material having radiation scattering and absorption characteristics similar to those of the optical fiber 1 may be provided at the upper end of the optical fiber 1. The extension may be vertically moved and may be located at a position where the effect of the groove 25 can be sufficiently ignored.

Instead of the provision of the groove 25 inside the metal filter 26, a material of the metal filter 26 corresponding to the groove 25 may be changed to a material allowing the scattering and absorption phenomenon of the optical fiber to be eliminated.

With the configuration described above, an effect on the response characteristics with respect to the radiations can be reduced in the confirmation of the operation of the radiation detector by using the optical pulses. As a result, it is possible to constantly confirm the operation of the radiation detector by using the optical pulses.

Third Embodiment

Figure 3:
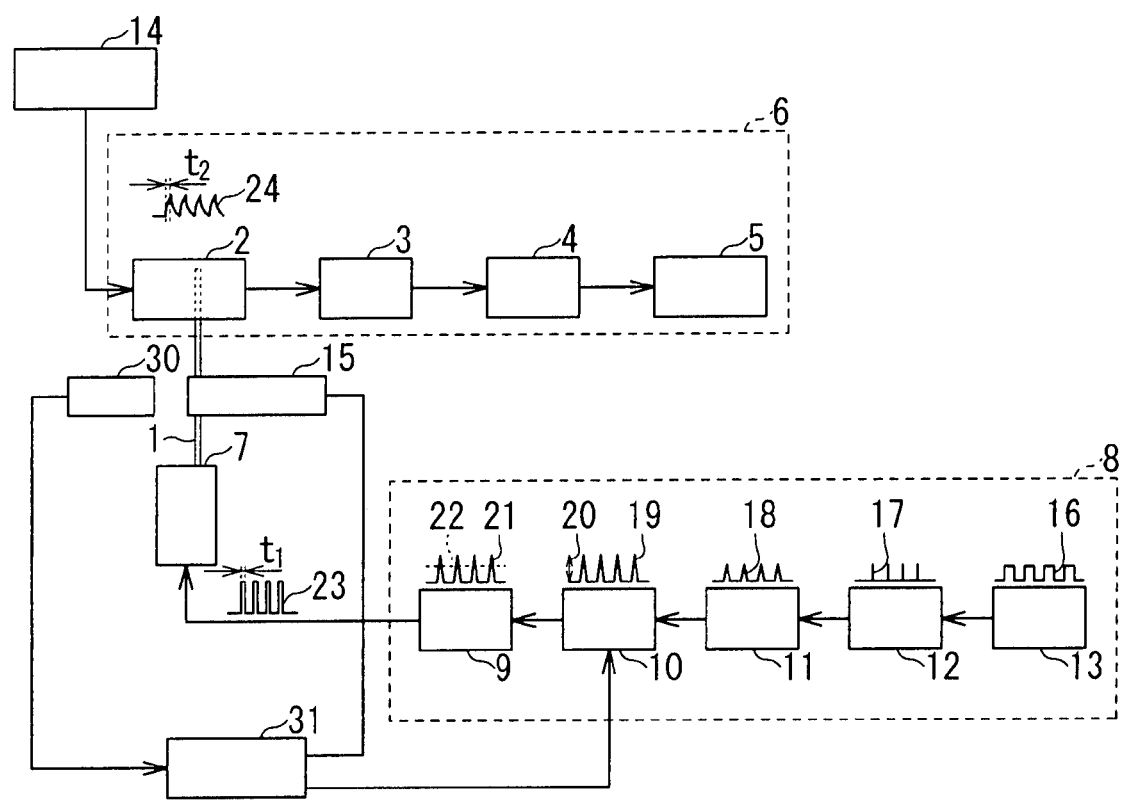
FIG. 3 is a block diagram illustrating an example of a configuration of a radiation detector according to a third embodiment of the present invention.

A radiation detector according to a third embodiment of the present invention will be described hereunder with reference to FIGS. 3, 4A, and 4B.

The radiation detector according to the third embodiment of the present invention is characterized by provision of a light sensor 30 near the radiation sensor 2 according to the second embodiment. An output from the light sensor 30 is supplied to an emission amount adjustment determining unit 31 and an output from the emission amount adjustment determining unit 31 is supplied to the amplifier 10 and the optical-fiber end adjusting mechanism 15 in order to adjust the emission from the optical pulse emitting unit 7. Although the amplifier 10 and the optical-fiber end adjusting mechanism 15 are subjected to manual adjustment in the first and second embodiments of the present invention, the amplifier 10 and the optical-fiber end adjusting mechanism 15 may be subjected to automatic adjustment in accordance with the output from the emission amount adjustment determining unit 31 in the third embodiment of the present invention. The output from the emission amount adjustment determining unit 31 may be supplied not only to the amplifier 10 and the optical-fiber end adjusting mechanism 15 but also to other components.

As described above, the output from the light sensor 30 is used to monitor the time and intensity characteristics of the optical pulse simulating the radiation. A signal used for adjusting the emission time characteristics is supplied to the amplifier 10 and a signal used for adjusting the emission intensity is supplied to the optical-fiber end adjusting mechanism 15. Accordingly, the amplifier 10 and the optical-fiber end adjusting mechanism 15 receive the respective signals to automatically adjust the emission time characteristics and the emission intensity.

The above configuration allows the emission intensity and the emission time characteristics to be automatically adjusted. Consequently, it is possible to provide the radiation detector provided with the operation confirming unit using the optical pulses and capable of being stably usable for a long time.

It is to be noted that the present invention is not limited to the described embodiments and many other changes and modifications may be made without departing from the scopes of the appended claims.

This application claims priority from Japanese Patent Application 2006-262438, filed Sep. 27, 2006, which is incorporated herein by reference in its entirety.

What is claimed is:
1. A radiation detector comprising:
    a radiation detecting unit including a radiation sensor comprising a single element adapted to directly convert radiation into an electric signal, the radiation sensor being capable of sensing light, the radiation detecting unit further including a signal amplifier, a pulse-height discriminator, and a counter;
    an optical pulse emitting unit configured to emit an optical pulse for confirming operational integrity of the radiation detecting unit;

an emission controlling unit configured to control an operation of the optical pulse emitting unit;

a light path through which light is led from the optical pulse emitting unit to a vicinity of the radiation sensor;

a circuit board to which the radiation sensor is attached; and a filter provided around the circuit board and configured to adjust response characteristics of radiation impinging on the filter and thereby producing filtered radiation and flattening the response of the radiation sensor, wherein the emission controlling unit includes a mechanism for adjusting emission time characteristics of the optical pulse emitting unit, and the radiation detecting unit is utilized to confirm a normal operation of the radiation detecting unit by having the optical pulse emitting unit inputting light to the radiation sensor, and wherein the filter is configured to adjust the response characteristics of the radiation impinging on the filter, to a form suitable for units of radiation to be measured by the radiation sensor that senses and directly converts the filtered radiation that has been filtered by the filter, wherein the filter is formed with a groove along which the light path is provided.

2. The radiation detector according to claim 1, wherein the emission controlling unit includes a clock generator, a rising edge detector, a triangular wave generator, an amplifier, and a pulse-height discriminator, and the amplifier includes an amplification varying unit configured to adjust the emission time characteristics.

3. The radiation detector according to claim 2, wherein the amplification varying unit is composed of a variable resistor.

4. The radiation detector according to claim 1, wherein the emission controlling unit includes a clock generator, a rising edge detector, a triangular wave generator, an amplifier, and a pulse-height discriminator, and the pulse-height discriminator includes a discriminated pulse-height value varying unit configured to adjust the emission time characteristics.

5. The radiation detector according to claim 4, wherein the discriminated pulse-height value varying unit in the pulse-height discriminator is composed of a variable resistor.

6. The radiation detector according to claim 1, further comprising an amount-of-light adjusting mechanism adjusting an amount of light incident on the radiation sensor.

7. The radiation detector according to claim 6, wherein the amount-of-light adjusting mechanism has a configuration varying a distance from the end of the light path toward the radiation sensor to the radiation sensor, the incident light being led from the optical pulse emitting unit to a vicinity of the radiation sensor through the light path.

8. The radiation detector according to claim 1, wherein the filter along the light path has a thickness smaller than that of a remaining portion of the filter.

9. The radiation detector according to claim 1, wherein the light path has, at a tip end thereof, an extension made of a material similar to that of the light path.

10. The radiation detector according to claim 1, wherein the light path is formed of an optical fiber.

11. The radiation detector according to claim 1, further comprising a light sensor disposed at a portion near the radiation sensor for monitoring emission characteristics.

12. The radiation detector according to claim 11, wherein the emission time characteristics of the optical pulse emitting unit are adjusted in accordance with an output from the light sensor.

13. The radiation detector according to claim 11, wherein the distance from the end of the light path to the radiation sensor is varied in accordance with an output from the light sensor.

14. The radiation detector according to claim 11, wherein an amplification of the amplifier or a discriminated pulse-height value of the pulse-height discriminator is varied in accordance with an output from the light sensor.

15. The radiation detector according to claim 1, wherein the radiation sensor is composed of a silicon diode, a scintillator and a photomultiplier, or a semiconductor made of cadmium telluride.

16. A radiation detector comprising:
a radiation detecting unit including a radiation sensor, a signal amplifier, a pulse-height discriminator, and a counter, the radiation sensor comprising a single element adapted to directly convert radiation into an electric signal sensitive to light bands including a visible light frequency band and a non-visible light frequency band;

an optical pulse emitting unit configured to emit an optical pulse for confirming operational integrity of the radiation detecting unit;

an emission controlling unit configured to control an operation of the optical pulse emitting unit;

a light path through which light is led from the optical pulse emitting unit to a vicinity of the radiation sensor;

a circuit board to which the radiation sensor is attached; and a filter provided around the circuit board and configured to adjust response characteristics of the radiation impinging on the filter and thereby producing filtered radiation and flattening the response of the radiation sensor, wherein the emission controlling unit includes a mechanism for adjusting emission time characteristics of the optical pulse emitting unit, and the radiation detecting unit is utilized to confirm a normal operation of the radiation detecting unit by having the optical pulse emitting unit inputting light to the radiation sensor, and wherein the filter is configured to adjust the response characteristics of the radiation impinging on the filter, to a form suitable for units of radiation to be measured by the radiation sensor that senses and directly converts the filtered radiation that has been filtered by the filter, wherein the filter is formed with a groove along which the light path is provided.

17. The radiation detector according to claim 1, wherein the groove of the filter is disposed above a top surface of the circuit board, and wherein the light path passes above the top surface of the circuit board.

18. The radiation detector according to claim 1, wherein the emission controlling unit includes a clock generator that generates a clock signal having a predetermined duty cycle, a rising edge detector connected to the clock generator and that detects rising edges in the clock signal and that outputs a rising edge signal train, a triangular wave generator connected to the rising edge detector and that receives the rising edge signal train and that creates a triangular-pulse signal train as a result thereof, an amplifier connected to the triangular wave generator and that amplifies the triangular-pulse signal train to create an amplified signal train, and a pulse-height discriminator connected to the amplifier and that discriminates a height of the amplified signal train, and the amplifier includes an amplification varying unit that adjusts the emission time characteristics.

* * * * *